United States Patent [19]

Muehlberger

[11] Patent Number: 5,225,655
[45] Date of Patent: Jul. 6, 1993

[54] PLASMA SYSTEMS HAVING IMPROVED THERMAL SPRAYING

[75] Inventor: Erich Muehlberger, San Clemente, Calif.

[73] Assignee: Electro-Plasma, Inc., Irvine, Calif.

[21] Appl. No.: 529,859

[22] Filed: May 29, 1990

[51] Int. Cl.$^5$ .............................................. B23K 9/06
[52] U.S. Cl. ...................... 219/121.47; 219/121.59; 219/121.57; 219/76.16; 427/446
[58] Field of Search ........... 219/76.16, 121.49, 121.47, 219/121.57, 76.19, 121.59, 75; 427/34

[56] References Cited

U.S. PATENT DOCUMENTS

| | | | |
|---|---|---|---|
| 3,598,944 | 8/1971 | Weimar et al. | 219/76.16 |
| 3,839,618 | 10/1974 | Muehlberger | 219/76.16 |
| 4,328,257 | 5/1982 | Muehlberger et al. | 219/121.47 |
| 4,370,538 | 1/1983 | Browning | 219/121.47 |
| 4,642,440 | 2/1987 | Schnackel et al. | 219/121.5 |
| 4,745,256 | 5/1988 | Shubert | 219/121.47 |
| 4,808,042 | 2/1989 | Muehlberger et al. | 219/121.47 |

*Primary Examiner*—Mark H. Paschall
*Attorney, Agent, or Firm*—Spensley Horn Jubas & Lubitz

[57] ABSTRACT

Apparatus for delivering heated powder to the plasma gun of the thermal spray plasma system includes a hollow heater tube coupled between a powder feeder and the plasma gun and a power supply coupled between opposite ends of the heater tube. The power supply heats the walls of the heater tube to a temperature below the melting point of the powder particles, to prevent melting and adhesion of the particles thereto. The length of the heater tube is selected to provide an adequate dwell-time of the powder particles therein for a given powder flow rate, so that even relatively large powder particles are heated to a temperature relatively close to that of the heater tube walls upon delivery to the plasma gun. The efficiency of the heater tube is improved by a water cooled reflector tube concentrically disposed about the outside of the heater tube, with oxidation of the tube surfaces being prevented by a flow of inert gas along the space between the heater and reflector tubes. The heated powder delivery apparatus can be used by itself and without the plasma gun to effect thermal spraying in instances where the powder is of the type that can be heated close to the melting point without adhering or clogging. One or more ring-shaped electrodes and associated DC power supplies can be disposed within the plasma stream to provide additional powder particle heating and control within the plasma stream itself.

18 Claims, 9 Drawing Sheets

PLASMA SYSTEMS HAVING IMPROVED THERMAL SPRAYING

BACKGROUND OF THE INVENTION

1. Field of the Invention

The present invention relates to plasma systems capable of thermal spraying of powdered materials for coating on a workpiece.

2. History of the Prior Art

It is known to provide a plasma system in which powders of metal or other materials are delivered to a plasma gun for introduction into a plasma stream produced by a plasma gun. The plasma stream which is created by a flow of inert gas in the presence of an electrical power source and typically in the presence of a low pressure source is directed from the plasma gun onto a workpiece or other target where the powder is deposited to form a coating. The powder, which may be preheated before introduction into the plasma stream at the gun, melts as it is entrained into and carried by the plasma stream so that a relatively dense coating is formed on the workpiece.

An example of such a plasma system is provided by U.S. Pat. No. 4,328,257 of Muehlberger et al., which patent issued May 4, 1982 and is commonly assigned with the present application. In the plasma system described in the Muehlberger et al. patent a low pressure source in the form of vacuum pumps is coupled to an enclosure containing a plasma gun and a workpiece to direct the plasma stream from the plasma gun to the workpiece at supersonic speeds. A powder feed mechanism heats and delivers powder into the side of the plasma gun for introduction into the plasma stream.

Earlier examples of plasma and plasma related systems providing heated powder are described in U.S. Pat. No. 3,598,944 of Weimar et al. which issued Aug. 10, 1971 and U.S. Pat. No. 3,839,618 of Muehlberger which issued Oct. 1, 1974. The Weimar et al. patent describes heating particulate matter before introduction into a plasma heating zone in a device for creating spherical granules of nuclear fuel. The Muehlberger patent describes a plasma system in which powder is preheated using an electrical resistance tube. Powder is fed from separate sources through a pair of such tubes using a heated carrier gas. The tubes heat the powder which is then introduced into the bore of the plasma gun. The tubes are resistively heated using a DC power supply coupled to the tubes.

In U.S. Pat. No. 3,839,618 of Muehlberger, powder particles are said to have a diameter which is no greater than 44 microns and preferably much less. The relatively small particle size of less than 50 microns typically required by heated powder delivery apparatus of the prior art is a characteristic limitation of such systems. The small particle sizes are required because of the ease with which such small particles can be preheated and then melted as they are rapidly accelerated in the plasma stream so as to produce a reasonably dense coating thereof on the workpiece.

However, small particles having diameters of less than 50 microns are not without their limitations. To begin with such particles are relatively expensive to manufacture, particularly in the case of materials such as refractory materials and getter materials. Refractory materials such as tungsten and molybdenum have relatively high melting points, while getter materials such as barium, titanium and tantalum oxidize rapidly. Moreover, such particles are of limited viscosity or flowability, making it relatively difficult to transfer them through apparatus such as heated tubes of relatively small inner diameter. Such small particles also tend to experience high surface oxidation, making it difficult to deliver the particles to the workpiece in a relatively pure, oxide-free form. The surface area to weight ratio of such particles tends to be relatively low, and the resulting poor thermal energy transfer makes it more difficult to control the heating of such particles.

On the other hand relatively large powder particles having diameters substantially in excess of 50 microns are advantageous over smaller particles in a number of important respects. In addition to being relatively inexpensive to manufacture, such particles have improved flowability. The ease of producing such particles in a highly pure form and the low surface oxidation typically undergone by such particles facilitate the production of a relatively dense, oxide-free coating on the workpiece. The major disadvantage of such large particles lies in the difficulty of achieving complete melting thereof within the plasma stream using conventional apparatus and techniques. The difficulty of melting such particles makes it very difficult to form a satisfactory coating on the workpiece. Even where such powders are preheated such as through the use of resistively heated delivery tubes, coating of the workpiece is difficult to accomplish.

The difficulty in thermal spraying relatively large particles heretofore relates to a more fundamental problem which has been a lack of understanding of the thermal spraying process in general. Heating of powder particles was often done in a standardized manner without regard to the different softening and melting characteristics of different materials as well as the varying characteristics of different particle sizes noted above. Also, it has usually been assumed that control of powder temperature as well as other characteristics of the powder delivery must occur at or just outside of the plasma gun.

Accordingly, it would be desirable to have a plasma system in which thermal spraying can be controlled by varying all parts of the plasma system which affect such spraying in an optimum manner. Such an improved system approach would include the ability to successfully accomplish thermal spraying of a variety of different powder materials having different softening and melting characteristics as well as different particle sizes.

More specific goals of an improved plasma system would include the ability to spray powdered materials of relatively large particle size in a manner producing a relatively dense and uniform coating on the workpiece. It would also be advantageous to provide heated powder delivery apparatus capable of preheating powder particles of any size so that the particles undergo substantially complete melting within the plasma stream, while at the same time providing a relatively smooth and continuous the particles through the powder delivery apparatus.

SUMMARY OF THE INVENTION

Plasma systems according to the invention benefit from a recognition of the influence which various parts of the plasma system have on the thermal spraying process. As a result the control provided by the various parts of the system is optimized to enhance the thermal spraying process. In addition to using improved preheating apparatus so that powders of different material or sizes can all be delivered into the plasma stream in a relatively uniform preheated state so as to optimize particle melting within the stream, the plasma gun can be adjusted to optimize particle density and acceleration within the plasma stream. Moreover, apparatus can be provided to control particle heating within the plasma stream, resulting in further improvements in the coating being formed on the workpiece.

Improved heated powder delivery apparatus and techniques according to the invention enable powders of relatively large particle size to be used. The temperature of the delivery apparatus is carefully controlled so that the walls or other portions thereof coming into contact with the particles are maintained below the melting temperature of the material of the particles. This prevents the surfaces of the particles from melting and adhering to the delivery apparatus. At the same time the temperature of the delivery apparatus is set with regard to the softening point of the powder material and the viscosity thereof so that the particles are heated uniformly to the highest temperature possible without causing them to clog the delivery apparatus or to lose the viscosity necessary for good flowability within the apparatus.

The length and other characteristics of the delivery apparatus are chosen so that the particles are relatively uniformly heated to a temperature close to that of the delivery apparatus upon introduction into the plasma gun. This encourages relatively complete melting of large particles within the plasma stream so that a dense coating is formed on the workpiece. The length and intensity of the plasma stream may also be adjusted to enhance melting of the particles, and where appropriate improved plasma apparatus may be utilized. Such improved plasma apparatus may employ additional power supplies in conjunction with electrodes to provide control of particle heating within different zones of the plasma stream so that the thermal spray process can be further optimized.

In a preferred arrangement of improved heated powder delivery apparatus in accordance with the invention, powder is delivered from a powder feeder to the plasma gun using a resistively heated delivery tube having a power source coupled to the opposite ends thereof. The power source is adjusted to provide the delivery tube with a surface temperature below but not substantially below the melting temperature of the powdered material being delivered. A mixture of carrier gas and the powder particles is introduced into the delivery tube in the presence of sufficient pressure to produce a standard flow rate through the delivery tube. The length of the delivery tube is carefully chosen in accordance with the other operating parameters so that the powder particles are relatively uniformly heated to a temperature close to that of the walls of the delivery tube before the powder particles are introduce the plasma gun. Other conditions being equal, an increase in the length of the delivery tube increases the residence time of the powder particles therein. The increased residence time reduces the temperature differential between the tube and the powder particles, enabling the powder particles to exit the delivery tube at a uniform temperature very close to that of the delivery tube.

The heated powder delivery tube is concentrically disposed within an outer reflector tube so that the powder delivery tube may be more efficiently heated. Water is pumped under pressure between the double walls of the outer reflector tube to provide cooling, while inert gas is circulated through the space between the powder delivery tube and the outer reflector tube to prevent oxidation.

In the case of certain powder materials which have a softening point just below the melting point of the material, the improved powder delivery apparatus allows for the elimination of the plasma gun for certain thermal spraying applications. The ability of the delivery apparatus to heat the powder to just below the melting point allows the powder particles to be sprayed directly from the delivery apparatus onto the workpiece. For such application, the delivery apparatus is provided with an exit nozzle of reduced diameter to help maintain pressure within the delivery apparatus.

The plasma system may be provided with one or more additional power sources coupled between electrodes positioned within the plasma stream to provide for control of the temperature of the powder particles within the plasma stream. One such embodiment includes a pair of ring-shaped electrodes, one of which is positioned at the plasma gun immediately outside of the gun bore and the other of which is positioned at a location intermediate the plasma gun and the workpiece. A DC power source coupled between the pair of ring-shaped electrodes increases the density of the plasma stream to provide greater heating of the powder particles. In another embodiment, plural electrodes spaced apart along the plasma stream are coupled to a plurality of different DC power sources, enabling individual control of powder particle temperature within different zones along the plasma stream. In a further embodiment, a lowermost electrode is positioned relatively close to the workpiece so that the transfer arc power source may be uncoupled from the workpiece after cleaning of the workpiece to prevent overheating the workpiece. In still further embodiments, power sources coupled to one or more electrodes have their negative terminals directly coupled to the cathode of the plasma gun to achieve a desired plasma temperature distribution. Still other embodiments employ permanent magnetic and electromagnetic members surrounding portions of the plasma stream to shape the plasma stream and distribute plasma temperature at the electrodes to prevent overheating.

Adherence of powder particles of different composition in the formation of composite particles is provided, where necessary or desirable, by treatment of at least part of the surface of the particles with an appropriate coating of material such as chromium. The coating can be applied by mixing, electroplating, or through use of a ball mix.

BRIEF DESCRIPTION OF THE DRAWINGS

A better understanding of the invention may be had by reference to the following specification in conjunction with the accompanying drawings, in which.

DETAILED DESCRIPTION OF THE INVENTION

Figure 1:
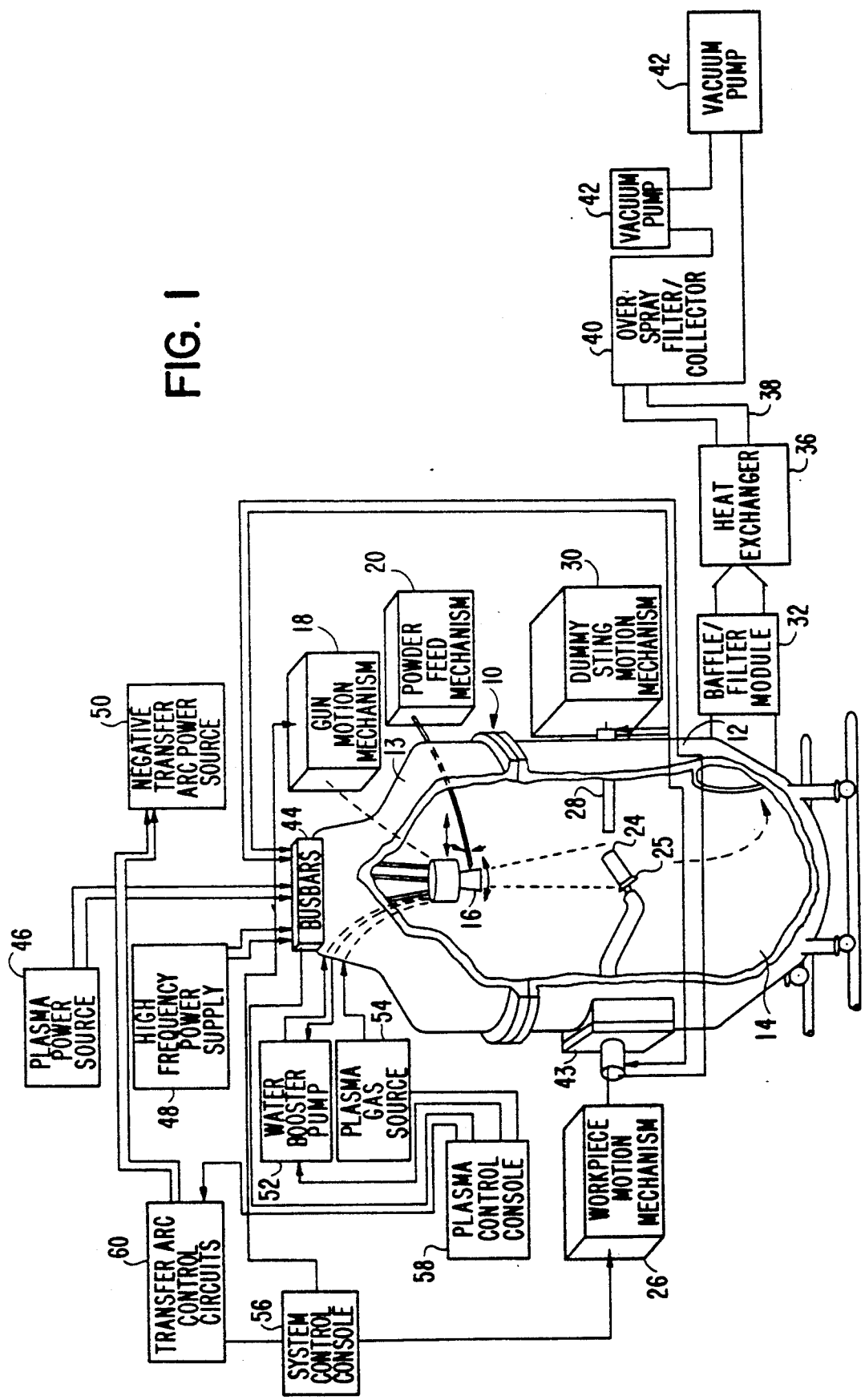
FIG. 1 is a combined block diagram and perspective view, partially broken away, of a plasma system having improved heated powder delivery apparatus and other features in accordance with the invention.

FIG. 1 depicts a plasma system having improved heated powder delivery apparatus and other features in accordance with the invention. The plasma system of FIG. 1 includes a plasma chamber 10 that provides a sealed vacuum-maintaining and pressure-resistant insulated enclosure. The chamber 10 is defined by a cylindrical principal body portion 12, and an upper lid portion 13 joined thereto. The body portion 12 of the plasma chamber 10 includes a bottom collector cone 14 that leads into and communicates with associated units for processing the exiting gases and particulates in maintaining the desired ambient pressure.

A downwardly directed plasma stream is established by a plasma gun 16 mounted within the interior of the chamber lid 13, the position of which gun 16 is controlled by a plasma gun motion mechanism 18. Both parts of the plasma chamber 10 are advantageously constructed as double-walled, water-cooled enclosures and the lid 13 is removable for access to the operative parts. The gun motion mechanism 18 supports and controls the plasma gun 16 through sealed bearings and couplings in the walls of the chamber lid 13.

Figures 2, 2A:
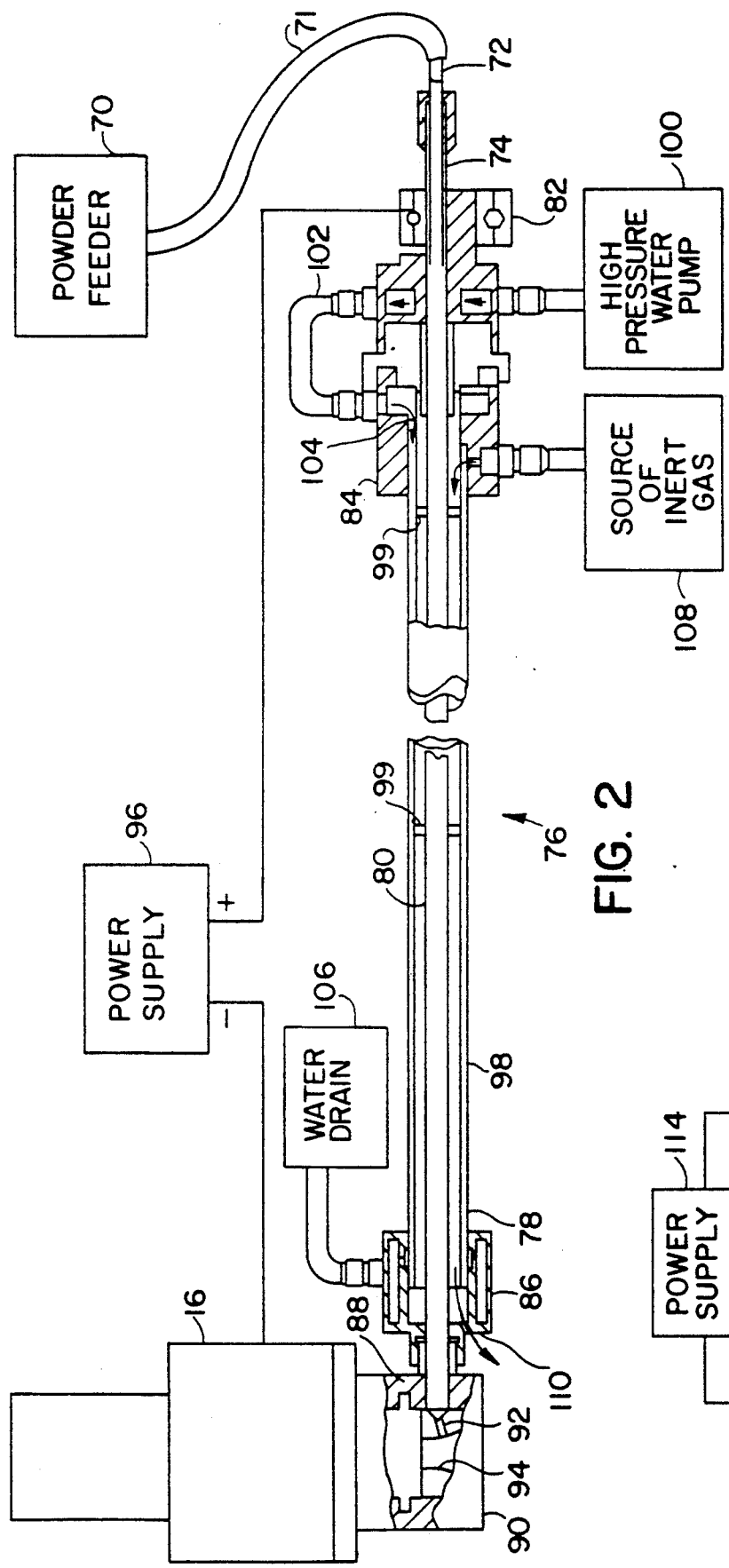
FIG. 2 is a sectional view of the improved heated powder delivery apparatus of the system of FIG. 1.
FIG. 2A is a front view of heater tube extension apparatus which may be used in conjunction with the heated powder delivery apparatus of FIG. 2 to improve the deposit efficiency.

A powder feed mechanism 20 which includes improved heated powder delivery apparatus shown and described in connection with FIG. 2 is coupled to the chamber lid 13 to provide controlled feed of a heated powder into the plasma stream through apparatus coupled to the plasma gun 16. The heated powder from the powder feed mechanism 20 is introduced into a plasma stream generated by the plasma gun 16.

The downwardly directed plasma stream from the plasma gun 16 impinges on a workpiece 24 which is supported on an internally cooled conductive workpiece holder 25 and which is positioned and moved while in operation via a shaft extending through the chamber body 12 to an exterior workpiece motion mechanism 26. Adjacent one end of the workpiece 24, but spaced apart therefrom, is a dummy workpiece or dummy sting 28 which is similarly internally cooled and coupled through a side wall of the chamber body 12 to a dummy sting motion mechanism 30. Both the workpiece holder 25 and the dummy sting 28 are adjustable as to insert position with respect to the central axis of the chamber 10 and electrically conductive so that they may be held at selected potential levels for transfer arc generation during various phases of operation.

Below the workpiece 24 and the dummy sting 28, the collector cone 14 directs the overspray gaseous and particulate materials into a baffle-filter module 32 having a water-cooled baffle section thereof for initially coupling the overspray and an in-line filter section thereof for extracting the majority of the entrained particle matter. Effluent passing through the baffle-filter module 32 is then directed through a heat-exchanger module 36, which may be another water-cooled unit, into a vacuum manifold 38 containing an overspray filter-collector unit 40 which extracts substantially all particulate remaining in the flow. The vacuum manifold 38 communicates with vacuum pumps 42 having sufficient capacity to maintain a desired ambient pressure within the chamber 10. This ambient pressure which is typically in the range from 0.6 atmospheres down to 0.001 atmospheres produces a static pressure sufficient to provide the plasma stream with supersonic speed.

The baffle-filter module 32 and the heat-exchanger module 36, as well as the overspray filter-collector 40, are preferably double-walled water-cooled systems, and any of the types well known and widely used in plasma systems may be employed. The entire system may be mounted on rollers and movable along rails for ease of handling and servicing of different parts of the system. Conventional viewing windows, water-cooled access doors and insulated feedthrough plates for electrical connection have not been shown or discussed in detail, for simplicity of illustration. The workpiece support and motion control system is advantageously mounted in a hinged front access door 43 in the chamber body 12.

Electrical energy is supplied into the operative portions of the system via fixed bus bars 44 mounted on the top of the chamber lid 13. Flexible water-cooled cables couple a plasma power source 46, a high-frequency power supply 48 and a negative transfer arc power source 40 via the bus bars 44 into the plasma gun 16 for generation of the plasma stream. The plasma power source 46 provides the requisite electrical potential difference between the electrodes of the plasma gun 16. The high-frequency power supply 48 is used to initiate an arc within the plasma gun 16 by superimposing a high-frequency voltage discharge on the DC power supply comprising the plasma power source 46. Thereafter the negative transfer arc power source 50 which is coupled between the plasma gun 16 and the workpiece 24 provides a continuous negative transfer arc therebetween in accordance with the invention.

Operation of the plasma gun 16 entails usage of a water booster pump 52 to provide an adequate flow of cooling water through the interior of the plasma gun 16. A plasma gas source 54 provides a suitable ionizing gas for generation of the plasma stream. The plasma gas here employed is either argon alone or argon seeded with helium or hydrogen, although other gases may be employed as is well known to those skilled in the art.

Control of the sequencing of the system of FIG. 1 and the velocity and amplitude of motion of the various motion mechanisms is governed by a system control console 56. The plasma gun 16 is separately operated under control of a plasma control console 58. Inasmuch as the functions performed by these consoles and the circuits included therein are well understood, they have not been shown or described in detail. Transfer arc control circuits 60 may be used to control the negative transfer arc power source 50.

Most of what has been shown and described in connection with FIG. 1 is similar to the plasma system described in previously referred to U.S. Pat. No. 4,328,257 of Muehlberger et al., and reference thereto is made to the extent that further explanation of one or more portions of the plasma system may be needed.

The powder feed mechanism 20 of FIG. 1 is shown in detail in FIG. 2 in conjunction with the plasma gun 16. The powder feed mechanism 20 includes a powder feeder 70 which provides a flow of inert gas containing a selected amount of powder to be introduced into the plasma gun 16. The powder feeder 70 can be of any appropriate conventional design. An example is the powder feeder described in U.S. Pat. No. 4,808,042 of Muehlberger et al. which issued Feb. 28, 1989 and which is commonly assigned with the present application. In the present example, the powder feeder 70 provides the powder at a standard flow rate of approximately 60 grams per minute using a carrier gas comprising a mixture of argon and hydrogen.

This flow of inert gas carrying the powder is provided via a conduit 71 to a powder fitting 72 at a first end 74 of heated powder delivery apparatus 76. The heated powder delivery apparatus 76, which has an opposite second end 78 mounted within a side of the plasma gun 16, is principally comprised of an elongated, resistively heated tube 80. The heater tube 80 is generally continuous with the powder fitting 72 so as to extend from a power connection clamp 82 at the first end 74 through a manifold 84 adjacent the first end 74 to a manifold 86 at the second end 78. The heater tube 80 extends through the manifold 86 and into a side wall 88 of an anode 90 of the plasma gun 16 where it terminates at an aperture 92 within the side wall 88. The aperture 92 extends to an internal bore 94 within the anode 90 where a plasma stream is generated by the plasma gun 16 in conventional fashion.

The heater tube 80 is made of material which heats in response to the application of a DC power supply 96 to the opposite ends thereof. In the present example the heater tube 80 is made of tungsten, is approximately ten feet in length, and has an outer diameter of 0.375 inches, and an inner diameter of 0.171 inches. The power supply 96 has the positive terminal thereof coupled to the power connection clamp 82 at the first end 74 and the negative terminal thereof coupled to the anode 90 of the plasma gun 16 which is in electrical contact with the opposite end of the heater tube 80 at the second end 78. The power supply 96 is a 120 KW DC power supply capable of providing a current flow of up to 1,500 amperes through the heater tube 80.

As described hereafter, the power supply 96 is adjusted to provide a desired voltage drop across and current flow through the heater tube 80. This results in the heater tube 80 being heated to a desired temperature along the length thereof in order to heat the powder to a desired temperature level as the powder is carried by the inert carrier gas from the powder feeder 70 through the length of the heater tube 80 and into the bore 94 of the plasma gun 16.

The heating efficiency of the heater tube 80 is improved by the presence of a reflector tube 98 which is larger than and is disposed about the outside of the tube 80 in generally concentric fashion. The concentric disposition of the reflector tube 98 about the heater tube 80 is maintained by ceramic spacers 99. The reflector tube 98, which has a hollow interior space between concentric inner and outer tubular walls thereof, extends between the manifolds 84 and 86. The reflector tube 98, which may be made of stainless steel, has a polished inner surface on the inside of the inner tubular wall thereof which reflects heat radiated from the heater tube 80 back to the tube 80. Consequently, the presence of the reflector tube 98 enables heating of the heater tube 80 to a selected temperature using less current from the power supply 96.

The reflector tube 98 is cooled by a water flow from a high pressure water pump 100. Initially, water from the pump 100 flows through the power connection clamp 82 to cool the clamp 82. From the power connection clamp 82, the cooling water flows through a conduit 102 and into the manifold 84. From the manifold 84 the water enters the hollow interior of the reflector tube 98 as shown by an arrow 104 and flows along the length of the reflector tube 98 to the manifold 86. At the manifold 86 the cooling water exits the reflector tube 98 and is fed to a water drain 106. In the present example the high pressure water pump 100 provides a water flow of approximately seven gallons per minute.

The manifold 84 also receives inert gas from a source 108 and directs the gas into the space between the outside of the heater tube 80 and the inside of the reflector tube 98. Apertures in the ceramic spacers 99 allow the inert gas to flow along the tubes 80 and 98 to the manifold 86 where the inert gas exits the manifold 86 via an aperture 110. The inert gas prevents oxidation of the heater tube 80 and the reflector tube 98.

In accordance with the invention the heater tube 80 is never heated to such an extent that the surface temperature thereof exceeds the melting point of the powder being delivered therethrough from the powder feeder 70. Preferably, the surface temperature of the heater tube 80 is slightly less than the temperature at which the powder softens to the point of losing the viscosity necessary to allow it to flow freely. A typical approach for powder material which has a known melting point and a known softening point is to determine the temperature between those two points at which flow of the powder becomes impaired and the powder begins to stick and clog. Having determined that temperature, the heater tube 80 is then heated to a temperature which is approximately 300° F. less. The temperature of the heater tube 80 within the apparatus shown in FIG. 2 can be carefully controlled as described hereafter.

Subject to the basic constraint that the tube surface temperature not reach the melting point of the powder, the other parameters are then adjusted so that the particles of powder are relatively uniformly heated to a temperature relatively close to the surface temperature of the heater tube 80 by the time they reach the second end 78 and are introduced into the bore 94 of the plasma gun 16. Such powder exit temperature is affected by the volumes and the flow rates of the inert carrier gas and the powder carried thereby. For a given tube temperature, gas volume, gas flow rate, powder volume and powder flow rate, the length of the heater tube 80 can be varied so as to vary the exit temperature of the powder at the plasma gun 16. Typically, the heater tube 80 in apparatus such as that shown in FIG. 2 is substantially longer than the resistively heated powder delivery tubes of the prior art. This provides a powder exit temperature relatively close to the surface temperature of the heater tube 80. Consequently the powder exit temperature is not substantially less than the melting point of the powder. This is particularly advantageous in the case of relatively large powder particles such as those exceeding 50 microns in diameter. Such larger particles when heated to relatively high exit temperatures are more easily melted within the plasma stream so as to achieve the relatively uniform high density coatings that are desired.

Figure 3:
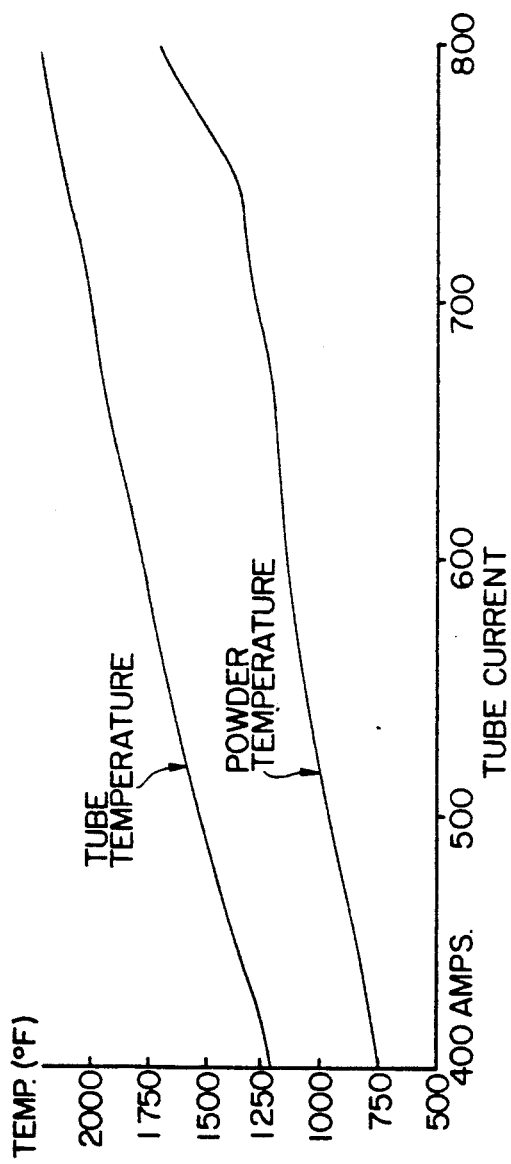
FIG. 3 is a diagrammatic plot of powder temperature and tube temperature as a function of current applied to resistively heat the powder delivery tube of the apparatus of FIG. 2.

FIG. 3 is a diagrammatic plot of the surface temperature of the heater tube 80 and the powder exit temperature as a function of current through the heater tube 80, for the apparatus shown in FIG. 2 and with the plasma gun 16 operated with an arc current of 1,450 amperes, an arc voltage of 52 volts and a total power of 75.4 KW. It will be seen that as the power supply 96 is adjusted to increase the heater tube current, the surface temperature of the tube increases in generally linear fashion. At a tube current of 400 amperes, the surface temperature of the tube is slightly below 1,250° F. As the tube current is increased to 800 amperes, the tube surface temperature increases to approximately 2000° F. The plot of tube temperature represents conditions after equilibrium has been established at the heater tube 80. When power is first applied to the heater tube 80, a period of at least several minutes is required for the tube to heat up to an equilibrium condition. Similarly, if the power applied to the heater tube 80 is suddenly increased or decreased by a substantial amount, a short period of time is required before equilibrium is established.

The power supply 96 is adjusted to a level at which the resulting heater tube current provides a tube surface temperature slightly below the melting point of the powder being delivered to the plasma gun 16 as previously discussed. This insures that the surfaces of the powder particles will not adhere to the inner walls of the heater tube 80 or otherwise clog so as to cause serious powder flow problems.

In addition to tube surface temperature, FIG. 3 also shows the variation of powder exit temperature as a function of tube current. It will be seen that powder exit temperature increases in somewhat linear fashion with increasing tube current. In the case of the apparatus of FIG. 2, and for a given gas volume and flow rate, and powder volume and flow rate, the powder exit temperature increases from approximately 750° F. at a tube current of 400 amperes to a temperature slightly below 1,750° F. at a tube current of 800 amperes.

The heater tube current is limited by the softening and melting points of the powder. Nevertheless, the powder exit temperature can be varied for a given tube current by adjusting other variables such as the flow rate of the powder and the inert carrier gas which carries the powder through the heater tube 80, and the length of the heater tube 80. The flow rates and quantities of the powder and the inert gas have optimum ranges for the given heated powder delivery apparatus being used. This being the case, the powder exit temperature can be raised to a value less than but relatively close to the tube surface temperature by choosing a longer length for the heater tube 80 as described hereafter.

Figure 4:
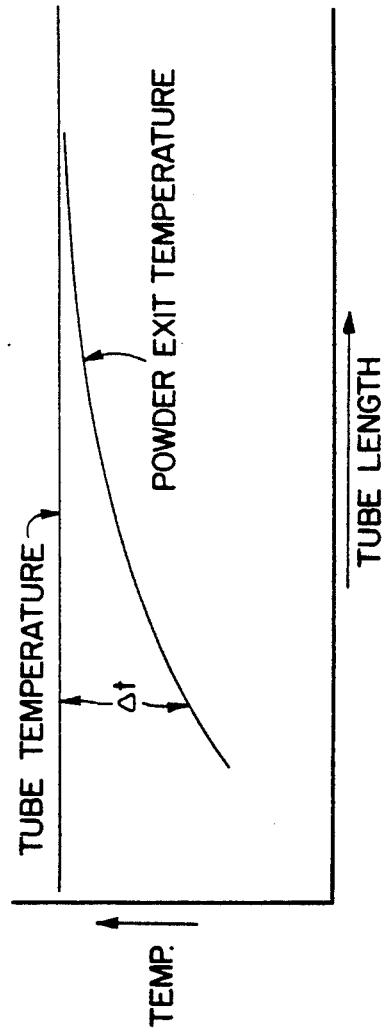
FIG. 4 is a diagrammatic plot of powder exit temperature as a function of length of the powder delivery tube in apparatus such as that shown in FIG. 2 for given powder velocity and carrier gas conditions within the powder delivery tube.

FIG. 4 is a diagrammatic plot of the powder exit temperature as a function of length of the heater tube. FIG. 4 assumes that the volumes and flow rates of the carrier gas and the powder carried thereby remain constant at optimum values. The tube surface temperature which is also illustrated in FIG. 4 is shown as being relatively constant. It is assumed that as the tube length is changed, the tube current is adjusted so as to achieve a tube surface temperature just below the melting point of the powder as previously described. A temperature differential $\Delta t$ exists between the powder exit temperature and the tube temperature. Desirably, $\Delta t$ is minimized, or in the ideal case is reduced to 0, so that the powder exit temperature is close to or equal to the tube surface temperature. This enables the powder to enter the plasma gun 16 with the highest temperature possible but at the same time without melting the powder particles as they travel through the heater tube 80.

As shown in FIG. 4 the powder exit temperature gradually increases, and at the same time $\Delta t$ decreases, as the tube length is increased. Eventually a point is reached at which the powder exit temperature is substantially equal to the tube surface temperature. This is considered to be an optimum operating region and is selected commensurate with the economics and practicalities of the tube length required and the power required to heat a tube of such length to the desired tube surface temperature. Longer tube length typically results in a longer dwell time of the powder within the tube so that a powder exit temperature at or close to the tube surface temperature can be achieved. The longer dwell time tends to enhance the uniformity of heating of the powder, particularly in the case of relatively large powder particles whose internal temperatures tend to remain at room temperatures long after the outer skin or surface temperature is raised. The relatively uniform heating of large powder particles to a temperature at or close to the tube surface temperature facilitates melting of the particles as they are introduced into the plasma stream within the plasma gun 16. Substantially complete melting of the particles within the plasma stream is required in order to achieve relatively high deposit efficiencies and the relatively uniform, highly dense coatings on the workpiece that result.

Figure 5:
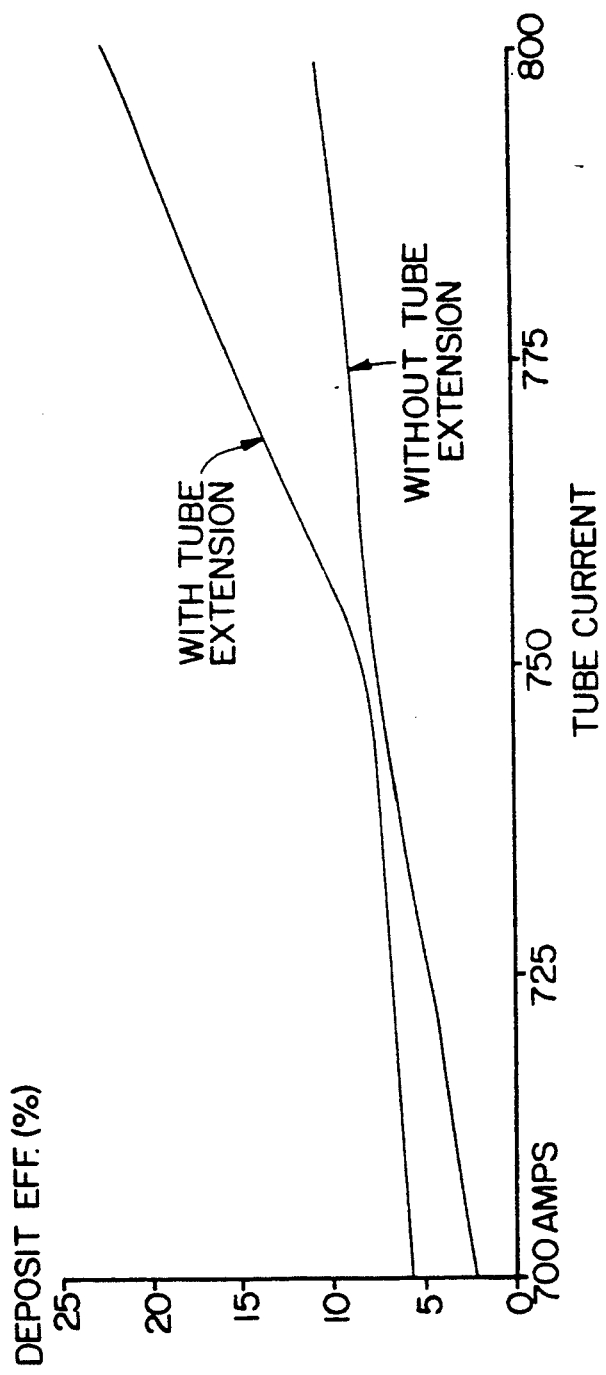
FIG. 5 is a diagrammatic plot of deposit efficiency of the sprayed powder particles on the workpiece of the plasma system as a function of current applied to resistively heat the powder delivery tube for the apparatus of FIG. 2 and for the case of such apparatus with an extension tube attached thereto.

FIG. 5 is a diagrammatic plot of deposit efficiency as a function of the current through the heater tube 80. The deposit efficiency is expressed as a percentage of the powder delivered to the plasma gun 16 which is transformed into the coating on the workpiece 24. The tube current is shown over a range of 700–800 amperes in FIG. 5.

Using just the heated powder delivery apparatus 76 shown in FIG. 2, the curve labeled "without tube extension" in FIG. 5 resulted. The deposit efficiency is seen to rise from a value of approximately 2% at 700 amperes to approximately 10% at 800 amperes.

When the heater tube extension apparatus of FIG. 2A is added to the apparatus of FIG. 2, deposit efficiency is improved. The extension apparatus of FIG. 2A includes a 16' length of stainless steel tubing 112 coupled between the powder fitting 72 and the conduit 71 to the powder feeder 70. A power supply 114 is coupled between the opposite ends of the tubing 112 to provide resistive heating of the tubing 112.

A curve labeled "with tube extension" in FIG. 5 shows the resulting deposit efficiency with the extension apparatus of FIG. 2A present. As the current from the power supply 96 was increased from 700 to 800 amperes, the separate power supply 114 coupled across the tubing 112 was adjusted to produce a current which increased from 45 amperes to 80 amperes. This produced a voltage drop across the tubing 112 which decreased from 55 volts to 49 volts, then increased to 56 volts. It will be seen from FIG. 5 that with the extension apparatus of FIG. 2A present, the deposit efficiency is considerably greater over the same current range of 700–800 amperes in the heater tube 80, particularly at the higher end of such current range. The deposit efficiency gradually increases from approximately 6% at 700 amperes to approximately 8% at 750 amperes. Above 750 amperes, the deposit efficiency increases at a substantially greater rate to a value of approximately 22% at 800 amperes.

It was previously noted that the heater tube 80 is preferably heated to a temperature which is below the melting point of the powder but which may be above the softening point. Experimentation will show that for a given powder material, the material softens to the point where the powder no longer flows well and begins to stick to itself and to the heater tube walls so as to create a potential clogging problem. Such a critical point is at a temperature below the melting point but above the softening point. Once this critical point is determined, the heater tube 80 is then heated to a temperature which is cooler by a safety margin such as 300° F. below the critical point.

Experimentation may be required, inasmuch as different powder materials have different softening characteristics. For example, tungsten carbide can be heated to within a few degrees of its melting point without losing its flowability or creating a danger of clogging. Aluminum, on the other hand, has a melting point of approximately 1200° F. and a softening point of approximately 700° F. When aluminum powder is being delivered, typically the heater tube 80 cannot be heated to a temperature much above 700° F. without danger of the powder clogging and losing its flowability. In such situations it may be necessary to provide further heating within the plasma stream, as described hereafter. Nevertheless, the invention enables heating of the powder as much as possible prior to introduction into the plasma gun and commensurate with delivery through a tube.

In the case of powder materials such as tungsten carbide which permit heating of the heater tube 80 to a temperature close to the melting point of the powder, it is possible for certain applications to use the heated powder delivery apparatus 76 to the exclusion of the plasma gun 16 as the sole apparatus for effecting thermal spraying. Such an arrangement is shown in FIG. 6.

Figure 6:
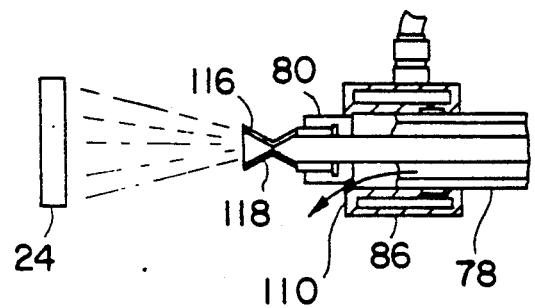
FIG. 6 is a sectional view of a portion of the improved powder delivery apparatus of FIG. 2 as modified to provide thermal spraying with a plasma gun for certain types of powder materials.

The heated powder delivery apparatus 76 is essentially unchanged in the arrangement of FIG. 6 except for the second end 78 which is shown therein together with the workpiece 24. The heater tube 80 terminates in a nozzle configuration 116 having a portion 118 thereof of restricted diameter. The portion 118 maintains pressure within the heater tube 80 while allowing the heated powder to exit therefrom with sufficient velocity to reach and form a coating on the workpiece 24. Inasmuch as the heated powder delivery apparatus 76 is capable of substantially uniformly heating the powder to a temperature just below its melting point, the substantially softened and almost molten powder coats the workpiece 24 in reasonably uniform fashion.

While the heated powder delivery apparatus 76 of FIG. 2 is particularly advantageous when used with relatively large particles such as those of greater than 50 microns diameter, such apparatus is useful with powder particles of almost any size. Because the heater tube 80 is maintained at a temperature safely below the melting point, small particles cannot overheat. Instead, they simply heat to the wall temperature of the heater tube 80 more quickly and over a shorter length of the tube 80. Most powder mixtures used in thermal spraying have particle diameters that vary over a range of sizes. In such cases, the apparatus 76 insures that the large particles as well as the smaller ones are heated to a temperature at or close to that of the heater tube 80 before being discharged by the apparatus 76.

While the heated powder delivery apparatus 76 of FIG. 2 is capable of heating most powders to a level that provides for substantially complete melting of the particles in the plasma stream, the apparatus 7 forms but one of several stages in the preheat plasma system. A second stage is formed by the plasma gun 16 itself. A third stage is formed by the plasma stream. As described hereafter, the plasma stream can comprise yet a fourth stage when equipped with additional power supplies and electrodes or the like to provide additional controlled heating of the powder particles.

The second stage comprised of the plasma gun 16 can be used to vary particle velocity and density. A minimum particle velocity is necessary to provide an acceptable coating on the workpiece 24. At the same time, larger particles are harder to accelerate upon introduction into the plasma stream. By adjusting the plasma stream within the plasma gun 16, particle velocity can be optimized. In the event plasma density has to be altered, this can be provided by adjusting the flow of inert gas and the arc power supply within the plasma gun 16.

The third stage comprised of the plasma stream can also be used to vary the powder conditions for optimum thermal spraying. In spite of the supersonic velocity of the plasma stream, it has been found that the temperature of the powder particles can be varied here as well. By increasing the reverse transfer arc power supply, more energy is imparted to the plasma stream, and more heating of the particles within the plasma stream occurs. In those instances where the powder particles are very large or are made of material which cannot be heated close to the melting point by the heater tube 80, so that substantially complete melting of the particles within the plasma stream does not otherwise take place, the transfer arc power supply can be increased to provide more heating of the particles within the plasma stream.

Figure 7:
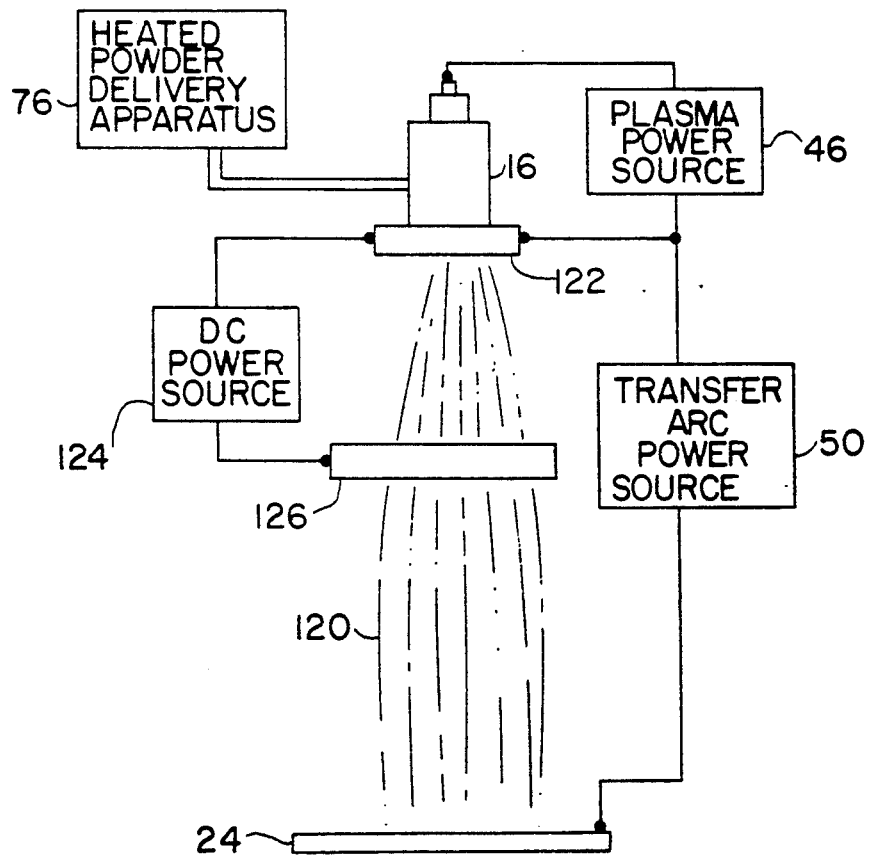
FIG. 7 is a schematic view of a portion of an improved plasma system for enhancing powder particle heating within the plasma stream thereof through addition of a power supply and electrode ring.

FIG. 7 provides an example of an arrangement in which the plasma stream is provided with apparatus creating a fourth zone in which additional heating of the powder is provided and can be controlled. The plasma system of FIG. 7 includes the plasma gun 16 and the heated powder delivery apparatus 76 for delivering heated powder particles to the plasma gun 16 in the manner previously described. The plasma source 46 shown and described in connection with FIG. 1 produces the requisite potential difference between the electrodes of the plasma gun 16 while the transfer arc power source 50 shown and described in FIG. 1 provides the voltage drop between the anode of the plasma gun 16 and the workpiece 24 that results in the negative transfer arc. The plasma gun 16 in turn produces a plasma stream 120. The plasma stream 120 which is illustrated in FIG. 7 by a series of dashed lines flows from the plasma gun 16 to the workpiece 24. The heated powder introduced into the plasma gun 16 from the heated powder delivery apparatus 76 is entrained into the plasma stream 120 being generated at the plasma gun 16. The plasma stream 120 accelerates and continues to heat the powder particles as they are carried by the plasma stream 120 for deposit on the workpiece 24.

The plasma system of FIG. 7 includes a ring-shaped electrode 122 electrically coupled to the anode of the plasma gun 16. As such, the ring-shaped electrode 122 forms a convenient electrode for the plasma power source 46 as well as power source 124. The DC power source 124 is coupled between the ring-shaped electrode 122 and a second ring-shaped electrode 126 disposed at a location intermediate the plasma gun 16 and the workpiece 24.

As previously noted, the energy of the plasma stream 120 provides some additional heating of the powder particles. However, the presence of the second ring-shaped electrode 126 and the potential difference between the electrode 126 and the first ring-shaped electrode 122 provided by the plasma acceleration and heating power source 124 can be used to provide further heating and acceleration of the powder particles. This is particularly advantageous in the case of relatively large powder particles, which are more difficult to accelerate and to completely melt than in the case of relatively small powder particles. The result is a coating on the workpiece 24 of greater uniformity and density. The DC power source 124 can be adjusted to vary the additional amount of energy to the plasma stream thereby.

Figure 8:
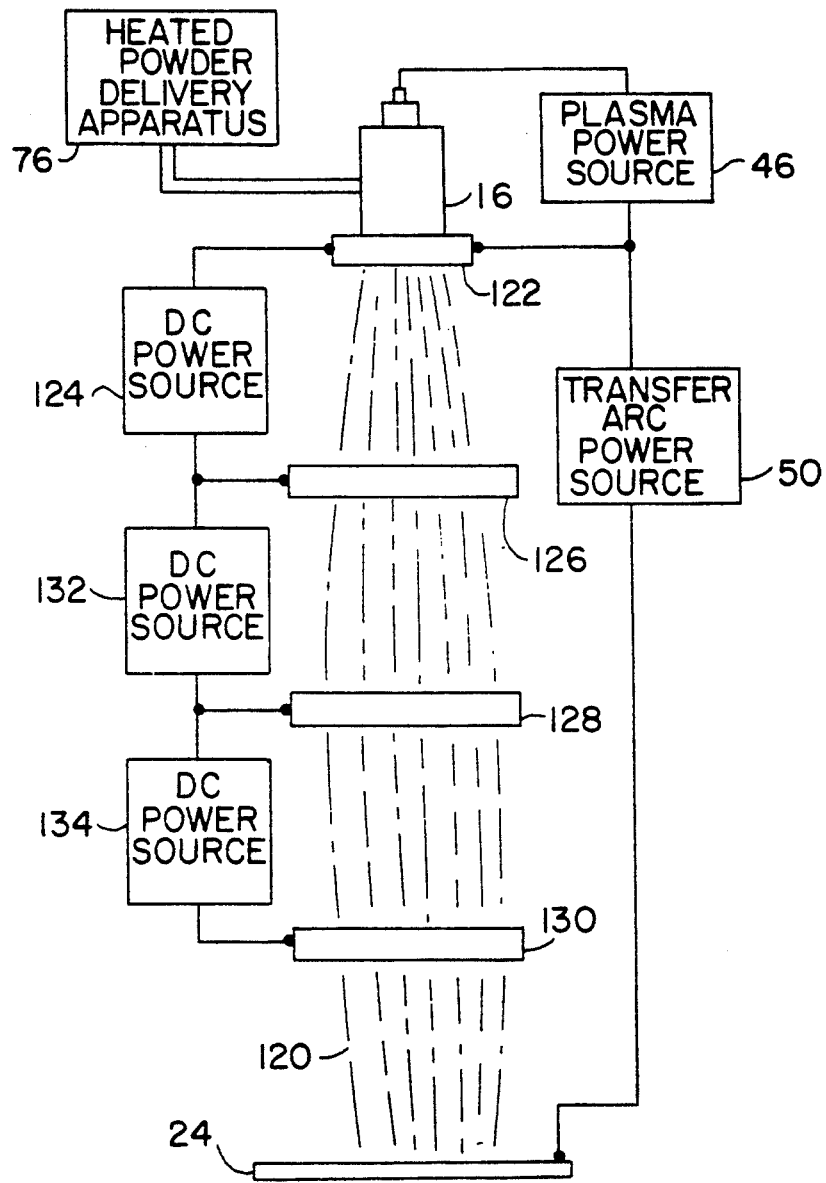
FIG. 8 is a schematic view of a portion of an improved plasma system for controlling powder particle heating within different zones along the plasma stream through use of additional power supplies and electrodes.

While the arrangement of FIG. 7 adds a single electrode 126 and the associated DC power supply 124, it is possible to add a plurality of such electrodes and power supplies to provide even greater control, as shown in the arrangement of FIG. 8. FIG. 8 is like FIG. 7 except that it includes additional electrodes 128 and 130 and DC power sources 132 and 134. The DC power source 132 is coupled between the electrodes 126 and 128, and the DC power source 134 is coupled between the electrodes 128 and 130. The electrodes 126, 128 and 130 effectively divide the plasma stream 120 into four different zones which can be somewhat individually controlled by the DC power sources 124, 132 and 134. The DC power sources 124, 132 and 134 can be adjusted to provide like power or different levels of power as desired.

The arrangement shown in FIG. 8 is especially useful in cases where the plasma stream 120 is very long and cannot be adequately powered by the transfer arc power source 50. However, the arrangement is useful with plasma streams of any length where it is necessary or desirable to control the temperature and to some extent the velocity of the powder particles within different zones along the plasma stream 120.

Although the electrodes 126, 128 and 130 are shown as being equally spaced between the electrode 122 and the workpiece 24, the spacing therebetween can be varied if desired. In addition, it is possible to couple DC power sources between different combinations of the electrodes and to even reverse the polarity of one or more of them to achieve different zone heating and acceleration effects.

In the arrangement of FIG. 8, the transfer arc power source 50 is coupled directly to the workpiece 24. In addition to providing the desired plasma action at the workpiece 24, such direct coupling is necessary if the workpiece 24 is to be cleaned prior to spraying of the powder from the heated powder delivery apparatus 76 onto the workpiece 24. Nevertheless, direct coupling of a power source such as the source 50 to the workpiece 24 creates considerable heat at the workpiece 24.

Figure 9:
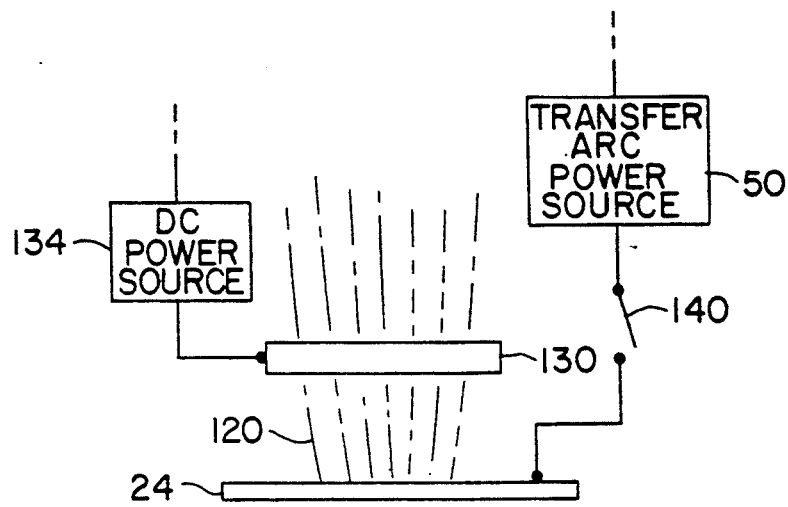
FIG. 9 is a schematic view of a portion of a plasma system similar to that of FIG. 8 but providing for uncoupling of the transfer arc power source from the workpiece to prevent overheating of the workpiece.

For workpieces 24 made of relatively delicate materials that are not capable of withstanding the heat that results from prolonged direct coupling of a power source thereto, it may be desirable to provide for uncoupling of the transfer arc power source 50 from the workpiece 24 during spraying. Such an arrangement which is shown in FIG. 9 includes a switch 140 coupled between the transfer arc power source 50 and the workpiece 24. In addition, the electrode 130 is lowered somewhat from its position as shown in FIG. 8 so as to be disposed relatively close to the workpiece 24. In all other respects, the plasma system of FIG. 9 is like that of FIG. 8.

During cleaning of the workpiece 24, the switch 140 is placed in a closed position to couple the transfer arc power supply 50 directly to the workpiece 24. As noted above, such direct coupling is necessary in order to achieve cleaning of the workpiece 24. Upon completion of the cleaning process, the switch 140 is opened so as to uncouple the transfer arc power source 50 from the workpiece 24. With the switch 140 opened, a plasma spraying operation is carried out. The relatively close proximity of the electrode 130 to the workpiece 24 allows the coating operation to take place at the workpiece 24 without the transfer arc power source 50 being coupled to the workpiece 24. In this way the workpiece 24 does not experience the intense heat that results when a power source is directly coupled thereto.

Figure 10:
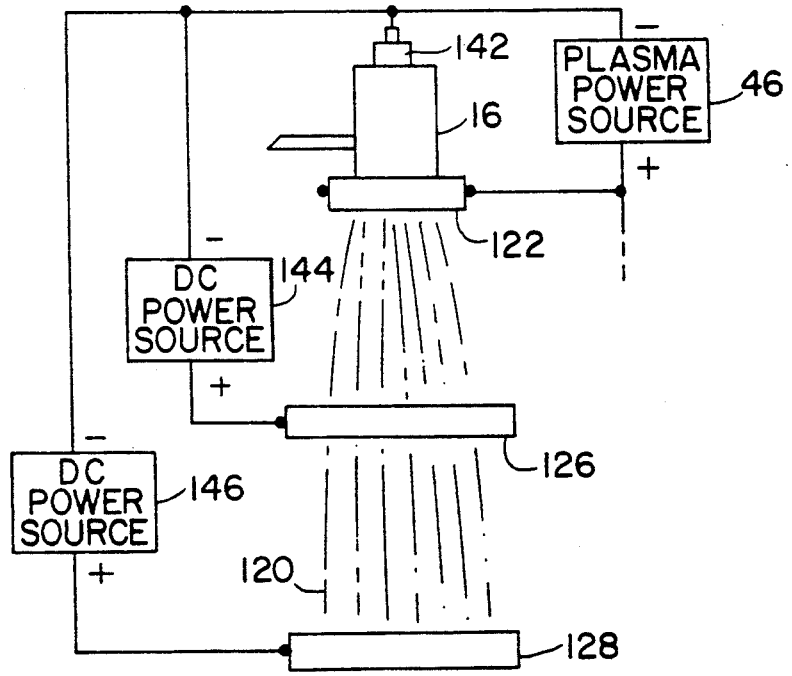
FIG. 10 is a schematic view of a portion of a plasma system similar to that of FIG. 8 but with the DC power sources for the electrodes coupled directly to the cathode of the plasma gun.

The arrangement of FIG. 10 which includes the plasma gun 16, the plasma power source 46 and the electrodes 122, 126 and 128 is a variation of the arrangement of FIG. 8 in which direct coupling of the power sources to a cathode 142 of the plasma gun 16 is utilized. The cathode 142 of the plasma gun 16 is a common emitter of electrons within the plasma gun 16. It has been found that by coupling one or more of the DC power sources to the cathode 142, a desired plasma temperature distribution can be achieved for certain applications. However, only the negative terminal of a power supply can be coupled directly to the cathode 142.

The negative terminal of the plasma power source 46 is always coupled to the cathode 142, inasmuch as this is the normal coupling of the power supply for the plasma gun. In the arrangement of FIG. 10, the negative terminals of DC power sources 144 and 146 which are respectively coupled to the electrodes 126 and 128 are also directly coupled to the cathode 142 of the plasma gun 16. The DC power sources 144 and 146 function much in the same manner as the DC power sources 124 and 132 of FIG. 8. However, because the power sources 144 and 146 are coupled directly to the cathode 142 of the plasma gun 16, they must be coupled with the polarity relationships shown in FIG. 10. Still other DC power sources within the plasma arrangement such as the DC power source 134 shown coupled to the electrode 130 in the arrangement of FIG. 8 can be coupled directly to the cathode 142 of the plasma gun 16 where desired, so long as the negative terminal of such power source is coupled to the cathode 142. As noted above, direct coupling of one or more DC power sources to the cathode 142 of the plasma gun 16 has been found to be advantageous in achieving a desired plasma temperature distribution for certain applications.

Figure 11:
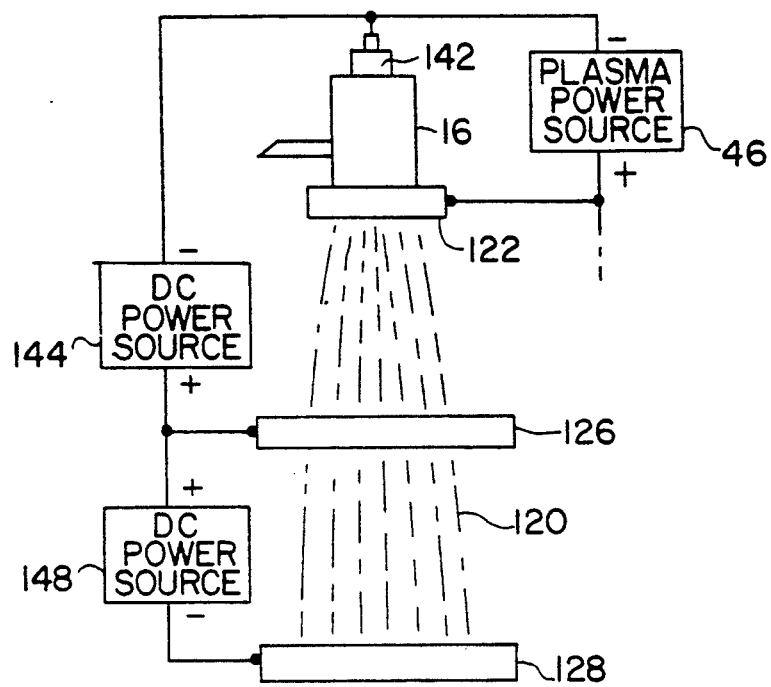
FIG. 11 is a schematic view of a portion of a plasma system similar to that of FIG. 10 but with one DC power source being coupled other than directly to the cathode of the plasma gun.

While direct coupling of one or more DC power sources to the cathode 142 requires that the negative terminal of such power sources be coupled to the cathode 142, still other DC power sources within a plasma system can be coupled with different polarity arrangements. This is illustrated by the plasma system of FIG. 11 which is like the arrangement of FIG. 10 except for the presence of a DC power source 148. Because the DC power source 148 is not directly coupled to the cathode 142, it may be poled as shown in FIG. 11 so that the positive terminal thereof is coupled to the electrode 126 and the negative terminal thereof is coupled to the electrode 128. However, the polarity of the DC power source 148 could be reversed if desired so as to achieve a particular temperature profile along the length of the plasma stream 120.

Figure 12:
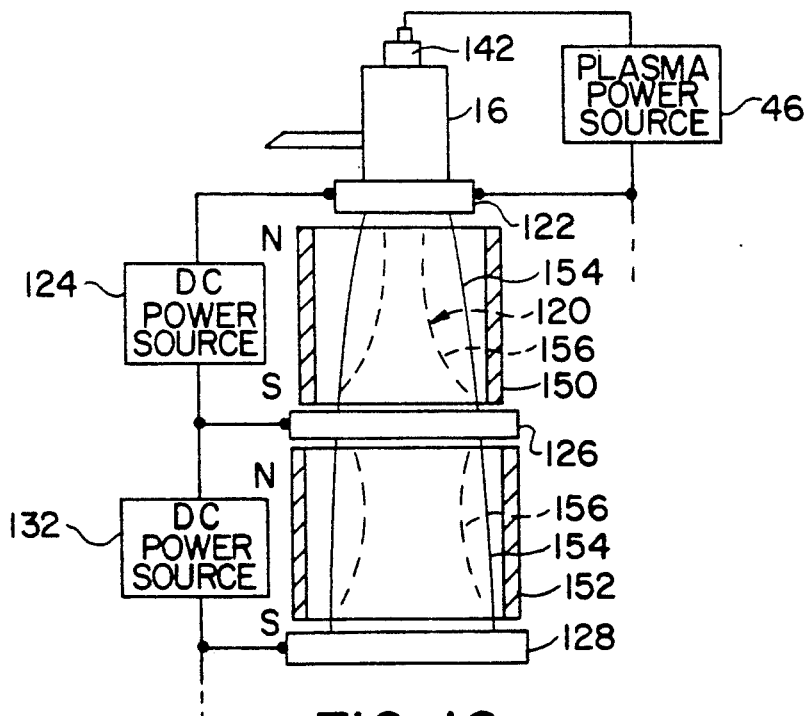
FIG. 12 is a schematic view of a portion of a plasma system similar to that of FIG. 8 but with a plurality of permanent magnetic members disposed about portions of the plasma stream to shape the plasma stream and distribute plasma temperature at the electrodes.

FIG. 12 shows a portion of a plasma system which is similar to that of FIG. 8 and which includes the plasma gun 16, the plasma power source 46, the electrodes 122, 126 and 128 and the DC power sources 124 and 132. In addition, the arrangement of FIG. 12 includes two different permanent magnetic members 150 and 152. The first permanent magnetic member 150 which is of hollow, generally cylindrical configuration is disposed between the electrodes 122 and 126 so as to encircle and encompass the portion of the plasma stream 120 therebetween. The permanent magnetic member 152 which is also of hollow, generally cylindrical configuration is disposed between the electrodes 126 and 128 so as to encircle the portion of the plasma stream 120 extending therebetween.

The normal outline of the plasma stream 120 is shown by solid lines 154 in FIG. 4. However, because of the presence of the permanent magnetic members 150 and 152, shaping of the plasma stream 120 is possible so as to provide certain advantages. Thus, the presence of the permanent magnetic member 150 changes the outline of the plasma stream 120 between the electrodes 122 and 126 from that shown by the solid lines 154 to a configuration illustrated by dashed lines 156. Similarly, the presence of the permanent magnetic member 152 reshapes the portion of the plasma stream 120 between the electrodes 126 and 128 such that the outline thereof is illustrated by dashed lines 156.

Such reshaping of the plasma stream 120 as is provided by the permanent magnetic members 150 and 152 provides a circular swirling motion of the electrons within the plasma stream 120 at the electrodes 126 and 128. This has the effect of distributing the heating created by the plasma at the electrodes 126 and 128 to prevent overheating of the electrodes 126 and 128.

The polarity of each of the permanent magnetic members 150 and 152 is shown in FIG. 12 for purposes of illustration only. Such polarities can be reversed, if desired, while still achieving the same advantageous effects of plasma stream shaping. While two permanent magnetic members 150 and 152 are shown in FIG. 12, additional permanent magnetic members can be used such as in conjunction with the entire length of the plasma stream between the electrodes 128 and 130 shown in the arrangement of FIG. 8. Also, the magnetic members 150 and 152 can assume other shapes and configuration than the hollow cylindrical shape shown.

Figure 13:
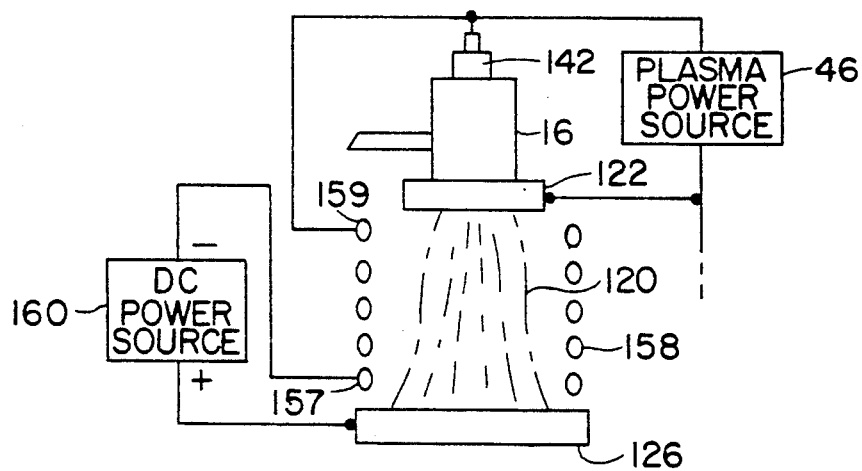
FIG. 13 is a schematic view of a portion of a plasma system similar to that of FIG. 12 but employing an electromagnetic coil instead of a permanent magnetic member.

FIG. 13 shows an alternative arrangement in which an electromagnetic coil 158 is disposed between the electrodes 122 and 126 so as to surround the portion of the plasma stream 120 extending therebetween. The electromagnetic coil 158 which is of generally cylindrical shape has the same effect as the permanent magnet members 150 and 152 of FIG. 12 in reshaping the plasma stream 120 and thereby providing more uniform temperature distribution at the electrode 126. Unlike the permanent magnetic members 150 and 152 of FIG. 12, the electromagnetic coil 158 must be coupled to a DC power source to provide the necessary magnetic field. Such a DC power source 160 is shown in FIG. 13.

The DC power source 160 is coupled between a first end 157 of the electromagnetic coil 158 and the electrode 126. At the same time, an opposite second end 159 of the electromagnetic coil 158 is coupled to the cathode 142 of the plasma gun 16. By connecting the electromagnetic coil 158 in this fashion, the single DC power source 160 serves both to power the electromagnetic coil 158 and to provide the needed power between the plasma gun 16 and the electrode 126. However, the use of the common DC power source 160 does not allow for separate adjustment of the power applied to the electromagnetic coil 158 and the power applied to the electrode 126. Because the DC power source 160 is effectively directly coupled to the cathode 142 of the plasma gun 16 by being coupled to the cathode 142 through the electromagnetic coil 158, the negative terminal of the DC power source 160 must be coupled to the electromagnetic coil 158 in the manner shown, for the reasons previously discussed.

Electromagnetic members having shapes and configurations other than that of the coil 158 can also be used. Moreover, the coil 158 can be formed as a permanent magnetic member rather than the electromagnetic member as described which requires a DC power source.

Occasionally the powder used in a thermal spray process is a composite of different materials. This can pose problems inasmuch as some materials do not readily mix with others, especially when heated. To overcome this problem it is possible to treat those particles that do not readily mix so that they adhere to particles of a different material. Materials such as chromium have been found to enhance adhesion when applied to part or all of the surfaces of particles that are reluctant to adhere. The chromium can be applied using various techniques such as mixing at room temperature, use of a ball mix, or electroplating. Chromium coatings are especially effective in the case of oxide particles that tend not to mix well with other particles.

While the invention has been particularly shown and described with reference to preferred embodiments thereof, it will be understood by those skilled in the art that various changes in form and details may be made therein without departing from the spirit and scope of the invention.

What is claimed is:

1. A method of delivering heated powder to a plasma gun comprising the steps of:
   providing powder particles having a diameter greater than 50 microns;
   heating a powder delivery tube to a temperature just below the melting temperature of the powder particles to be delivered by the tube; and
   passing the powder particle through the powder delivery tube so that the powder particles reside within the powder delivery tube long enough to be heated to a temperature which is not substantially less than the temperature of the powder delivery tube.

2. The invention set forth in claim 1, wherein the step of passing the powder particles through the powder delivery tube includes the step of, for a given flow rate of the powder particles through the powder delivery tube, selecting a tube length that will enable the powder particles to be heated to a temperature which is relatively close to the temperature of the powder delivery tube before the powder particles exit the tube.

3. The invention set forth in claim 1, wherein the temperature just below the melting temperature is determined by heating the powder particles past a softening point to a critical point at which the powder particles begin to adhere and clog and then reducing the critical point temperature by a safety margin.

4. A method of delivering heated powder to a plasma gun from a powder feeder, the powder feeder providing powder of given particle size which is greater than 50 microns in diameter and given melting point at a given flow rate, comprising the steps of:
   providing powder of given particle size which is greater than 50 microns in diameter;
   coupling a tube between the powder feeder and the plasma gun to feed powder from the powder feeder to the plasma gun at the given flow rate;
   heating the tube to a temperature relatively close to but not as high as the melting point of the powder; and
   for the given flow rate and particle size of the powder and the temperature of the tube, providing the tube with a length which causes heating of the powder to a temperature relatively close to the temperature of the tube upon feeding of the powder to the plasma gun.

5. Apparatus for delivering heated powder from a source of powder to a plasma gun comprising the combination of:
   a hollow heater tube coupled between the source of powder and the plasma gun;
   a power supply coupled between opposite ends of the heater tube; and
   a hollow reflector tube generally concentrically disposed about the heater tube and being operative to reflect heat radiated by the heater tube.

6. The invention set forth in claim 5, wherein the reflector tube is comprised of concentric inner and outer cylindrical walls having a space therebetween, and further including means for providing a flow of cooling fluid through the space between the inner and outer cylindrical walls of the reflector tube.

7. The invention set forth in claim 5, wherein the reflector tube has a reflective inner wall, and further including a plurality of ceramic spacer elements disposed between the reflective inner wall of the reflector tube and the heater tube to mount the heater tube concentrically within the reflector tube.

8. The invention set forth in claim 5, wherein there is a space between the reflector tube and the heater tube, and further including means for providing a flow of inert gas through the space between the reflector tube and the heater tube.

9. The invention set forth in claim 5, wherein the heater tube has a length which is established in accordance with a flow rate of powder therethrough and a surface temperature thereof so that the powder from the source of powder is delivered to the plasma gun at a temperature not substantially less than the surface temperature of the heater tube.

10. A thermal spray system comprising the combination of:
    a source of powder for delivering a powder in a carrier gas under pressure;
    a hollow heater tube having a first end coupled to the source of powder for receiving the powder in the carrier gas under pressure and an opposite second end for delivering the powder from the heater tube;
    a power supply coupled to the heater tube for heating the heater tube to a temperature not substantially less than the melting point of the powder; and
    means for locating a workpiece just outside of and directly facing the second end of the heater tube for directing the powder from the second end of the heater tube directly onto the workpiece to form a coating of the powder thereon.

11. The invention set forth in claim 10, wherein the heater tube terminates at the second end thereof in a nozzle having a necked-down portion.

12. A plasma system comprising the combination of:
    a workpiece;
    a plasma gun spaced from the workpiece and operative to provide a plasma stream to the workpiece;
    means for delivering powder to the plasma stream provided by the plasma gun;
    an electrode disposed in the plasma stream between the plasma gun and the workpiece;
    a power source coupled to provide a potential difference between the plasma gun and the electrode; and
    a hollow magnetic member surrounding the plasma stream and disposed between the plasma gun and the electrode, the magnetic member providing a magnetic field to shape the plasma stream and distribute heat produced by the plasma stream on the electrode.

13. A plasma system comprising the combination of:
    a workpiece;
    a plasma gun spaced from the workpiece and operative to provide a plasma stream to the workpiece;
    means for delivering powder to the plasma stream provided by the plasma gun;
    an electrode disposed in the plasma stream between the plasma gun and the workpiece; and
    a power source coupled to provide a potential difference between the plasma gun and the electrode;
    the electrode comprising a plurality of electrodes disposed in spaced apart relation along the plasma stream and the power source comprising a plurality of power sources coupled between different pairs of the plurality of electrodes.

14. A plasma system comprising the combination of:
    a workpiece;

a plasma gun spaced from the workpiece and operative to provide a plasma stream to the workpiece;

means for delivering powder to the plasma stream provided by the plasma gun;

an electrode disposed in the plasma stream between the plasma gun and the workpiece;

a power source coupled to provide a potential difference between the plasma gun and the electrode; and a transfer arc power source coupled to the plasma gun and a switch coupled between the transfer arc power source and the workpiece.

15. A method of thermal spraying a powder composite comprising the steps of:

coating at least portions of surfaces of powder particles of a first material;

mixing the powder particles of a first material with powder particles of a second material different from the first material to form a powder composite;

heating the powder composite; and introducing the heated powder composite into a plasma stream for thermal spraying onto a workpiece.

16. The method of claim 15, wherein the step of coating at least portions of surfaces of powder particles of a first material comprises coating the surface of powder particles of the first material with chromium.

17. A method of preparing a powder composite for thermal spraying comprising the steps of:

providing powder particles of first and second materials;

coating at least portions of surfaces of powder particles of the first material with a third material affecting the attraction of the first and second materials to each other; and mixing together the powder particles of the first and second materials.

18. The method of claim 17, wherein the first material is a metallic oxide and the third material is chromium.

* * * * *